United States Patent [19]

Stark

[11] Patent Number: 4,684,004

[45] Date of Patent: Aug. 4, 1987

[54] METHOD AND APPARATUS FOR CONTROLLING HYDRAULIC VEHICLE TRANSMISSION

[75] Inventor: Robert A. Stark, Gurnee, Ill.

[73] Assignee: Dresser Industries, Inc., Dallas, Tex.

[21] Appl. No.: 833,189

[22] Filed: Feb. 27, 1986

[51] Int. Cl.[4] ............................................. F16D 25/11
[52] U.S. Cl. ................................ 192/87.13; 192/3.57; 192/109 F
[58] Field of Search ................... 192/3.57, 3.55, 3.54, 192/3.62, 87.19, 87.18, 87.14, 87.1, 109 F, 87.13

[56] References Cited

U.S. PATENT DOCUMENTS

| | | | |
|---|---|---|---|
| 3,198,027 | 8/1965 | Ramsel et al. | 192/109 F X |
| 3,762,518 | 10/1973 | Hilpert | 192/3.57 X |
| 3,799,308 | 3/1974 | Erisman | 192/109 F X |
| 4,046,160 | 9/1977 | Horsch | 192/3.57 X |

*Primary Examiner*—George H. Krizmanich

[57] ABSTRACT

The transmission control for a vehicle hydraulic transmission includes a sequence control valve that includes a shuttle valve and an interconnected sequence valve which are connected with speed and direction clutches of the transmission. The shuttle valve senses the drop in pressure in the direction clutches when they are shifted to actuate the sequence control valve to initially dump the speed clutch and then to keep that clutch disengaged until the direction clutch has fully re-engaged.

8 Claims, 4 Drawing Figures

METHOD AND APPARATUS FOR CONTROLLING HYDRAULIC VEHICLE TRANSMISSION

BACKGROUND OF THE INVENTION

This invention relates generally to controls for hydraulic vehicle transmissions. More particularly, but not by way of limitation, this invention relates to an improved transmission control system that includes a valve for determining the sequence of actuation of certain clutches within the transmission.

Vehicles, such as front-end loaders used in the construction and mining industries, may weigh as much as 200,000 pounds. Such vehicles are subjected to frequent forward and reverse movements in order to accomplish the tasks for which they were designed. To make such vehicles efficient, it is necessary that the directional changes between forward and reverse movements be accomplished while the vehicle is in motion. Manifestly, sudden changes in direction of such large vehicles impose tremendous loads on the vehicle drive trains and especially on the transmission clutches.

Attempts to solve the transmission control problems are exemplified by U.S. Pat. Nos. 3,799,308 issued Mar. 26, 1974, to Edward R. Erisman; 3,468,194 issued Sept. 23, 1969, to Joachim Horsch, et al; 4,046,160 issued Sept. 6, 1977, to Joachim Horsch; and 4,135,610 issued Jan. 23, 1979, to Probir K. Chatterjea.

The transmissions in which the above mentioned controls are utilized include a directional clutch, that is, a clutch which drives the vehicle in forward or reverse and one or more speed or range clutches which determine the velocity of the vehicle. In order to absorb the tremendous forces developed upon reversal in the direction of travel of these large vehicles, one of the clutches must be designed to absorb the forces and heat generated. Generally, the clutch designed to absorb such loading is the first speed or range clutch. Accordingly, it is desired that this clutch be engaged after the directional clutch so that it can absorb the forces generated.

In addition, it is preferable to be able to completely reduce the pressure in the range clutch when it is not engaged to avoid damage that may be caused by partial engagement.

The object of this invention is to provide an improved transmission control system for fully engaging and disengaging the transmission clutches in the proper sequence to absorb the generated force and to avoid damage to such clutches.

SUMMARY OF THE INVENTION

In one aspect, this invention provides an improved hydraulic control system that comprises a sequence valve that is connected to a hydraulic pump and reservoir and that is connected with the transmission clutches. The sequence valve includes a shuttle valve and a spool valve that are interconnected and arranged, upon shifting of the transmission, to dump the speed clutch to the reservoir and to direct hydraulic fluid to the directional clutch. When the directional clutch has been engaged the pressure is applied through the sequence valve to direct fluid to the range clutch engaging that clutch.

In another aspect, this invention provides an improved sequence valve that assures complete venting to sump and prevents actuation of the speed clutch until after engagement of the directional clutch.

BRIEF DESCRIPTION OF THE DRAWING

The foregoing and additional objects and advantages of the invention will become more apparent as the following detailed description is read in conjunction with the accompanying drawings wherein like reference characters denote like parts in all views and wherein:

FIG. 1 is a schematic view illustrating an improved transmission control system that is constructed in accordance with the invention.

FIG. 3 is a schematic, cross-sectional view of a portion of the sequence valve in another operating position.

FIG. 4 is a view similar to FIG. 3, but illustrating the valve in still another operating position.

DETAILED DESCRIPTION OF THE PREFERRED EMBODIMENT

Figures 1, 3, 4:
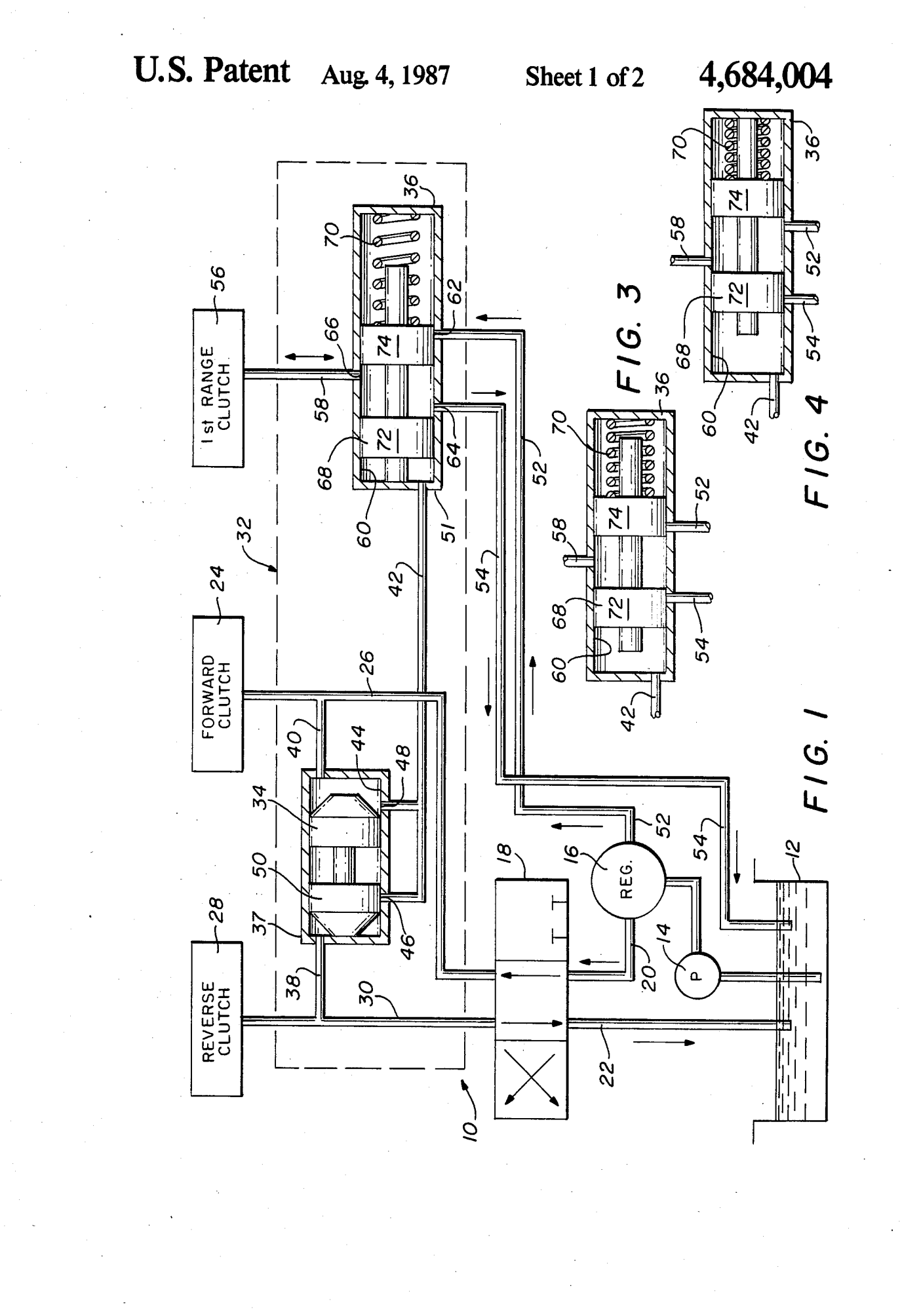
Figure 2:
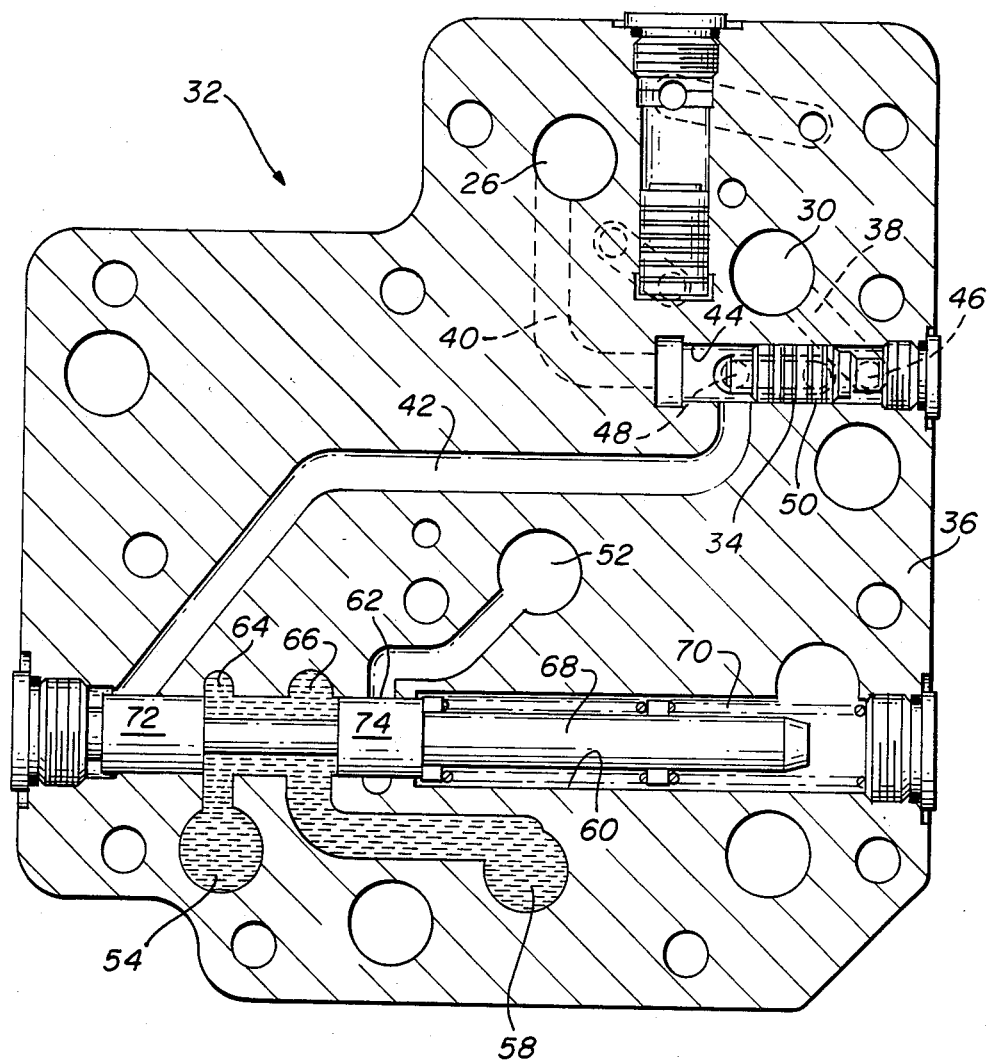
FIG. 2 is an enlarged, cross-sectional view of a sequence valve used in the system of FIG. 1 that is also constructed in accordance with the invention.

Referring to the drawing and to FIG. 1 in particular, shown therein and generally designated by the reference character 10 is a hydraulic transmission control system that is constructed in accordance with the invention. The system 10 includes a hydraulic fluid reservoir 12 connected to the inlet of a pump 14. An outlet of the pump 14 outlet is connected to a regulator or reducing valve 16. The regulator 16 is designed to set the hydraulic pressure at its outlet to about 350 p.s.i. for the clutches and as desired for other apparatus (not shown).

A directional clutch selector valve 18 has its inlet connected to the regulator 16 by a conduit 20. A return outlet of the selector valve 18 is connected by a return conduit 22 to the reservoir 12.

The selector valve 18 is also connected to a forward clutch 24 by a conduit 26 and to a reverse clutch 28 by a conduit 30. The selector valve 18 is constructed so that hydraulic fluid can be directed thereby to either the forward clutch 24 or the reverse clutch 28 depending upon the desired direction of movement of the vehicle (not shown).

A sequence valve assembly 32 is illustrated in FIG. 1 by the dash line and encompasses a shuttle valve 34 and a sequence valve 36. The details of construction of the sequence valve assembly 32 are illustrated more completely in FIG. 2.

The shuttle valve 34 includes a housing 37 that is connected by the branch conduit 38 to the conduit 30 which extends between the selector valve 18 and the reverse clutch 28. The opposite end of the shuttle valve 34 is connected by a branch conduit 40 with the conduit 26 which extends from the selector valve 18 to the forward clutch 24. A conduit 42 intersects a bore 44 in the housing 37 of the shuttle valve 34 at spaced locations 46 and 48 so that shuttle valve member 50, when moving in bore 44, alternately closes and opens 46 and 48 providing flow through the conduit 42 from the bore 44 when connected with either the reverse clutch 28 or forward clutch 24.

The sequence valve 36 includes a housing 51 that is connected by a conduit 52 with the regulator 16, with the reservoir 12 by conduit 54 and with the first range or speed clutch 56 by a conduit 58. The conduit 52 intersects a bore 60 in the housing 51 of the sequence valve 36 at 62. The conduit 54 intersects the bore 60 at 64 and the conduit 58 intersects the bore 60 at 66.

The sequence valve 36 includes a spool valve member 68 that is moveable in the bore 60. The spool valve member 68 is urged to the left, as shown in both FIG. 1 and 2, by a spring 70. The spool valve member 68 includes spaced sealing portions 72 and 74 that are in sliding and sealing engagement with the housing 51 in the bore 60.

The sealing portions 72 and 74 are located in relation to the intersections 62, 64, and 66 so that when the valve member 68 is in the position illustrated in FIGS. 1 and 2, the first range clutch 56, through the conduit 58, the sequence valve 36 and the conduit 54, is connected directly to the reservoir 12. When the valve member 68 is in this position, it will be noted that the sealing portion 74 blocks the intersection 62 and thus is closed preventing pressurized hydraulic fluid from reaching the clutch 56.

It should be pointed out that most vehicles include more than one speed clutch. When so equipped, a speed or range selector valve (not shown) will be interposed in the conduits 52 and 54. Such a valve will be utilized to direct the hydraulic fluid to the desired clutch.

OPERATION

Assuming that the vehicle (not shown) is moving in the reverse direction, the operator shifts the selector valve 18 to the forward position illustrated in FIG. 1. In this position, pressurized fluid is provided through the conduit 26 to the forward clutch 24. Some small amount of pressurized fluid is also starting to flow through the conduit 40 into the shuttle valve 34 to eventually move shuttle valve member 50 to the position illustrated.

Simultaneously, the selector valve 18 has connected the reverse clutch 28 through conduits 30 and 22 to the reservoir 12 totally releasing or disengaging the reverse clutch 28. Also, the conduit 42 has been dumped to the reservoir through the branch conduit 38 lowering the pressure in the bore 60 of the sequence valve 36 adjacent to the seal portion 72 sufficiently so that the spring 70 drives the spool valve member 68 into the position illustrated in FIGS. 1 and 2. The first range clutch is now completely disengaged since conduit 58 and conduit 54 are in communication through the valve 36 and dump any hydraulic fluid in the clutch 56 therein to the reservoir 12. The conduit 52 is closed by seal portion 74 on the spool valve member 68 and no hydraulic fluid can reach the clutch 56.

As the forward clutch 24 begins to fill, pressure starts to build therein and hydraulic fluid passes through the branch conduit 40 into the bore 44 of the shuttle valve 34. After the shuttle valve member 50 moves past intersection 48 and bottoms in bore 44, the fluid begins filling the conduit 42 and begins passing into the bore 60 of the sequence valve 36. When the pressure in the sequence valve 36 is sufficient to overcome the force exerted by the Spring 70, the sequence valve member 68 begins to move reaching the position illustrated in FIG. 3. As shown therein, the spool valve member 68 has reached the position wherein the seal portion 72 closes the conduit 54 preventing any additional flow to the reservoir 12 and the seal portion 74 closes the conduit 52 so that hydraulic fluid still cannot reach the clutch 56.

At this time, the forward clutch 24 is almost completely engaged. As soon as the hydraulic pressure is adequate to totally engage the forward clutch 24, the pressure in the conduit 42 increases sufficiently to move the spool valve member 68 to the position illustrated in FIG. 4. As shown therein, the seal portion 72 has closed the conduit 54 and the seal portion 74 has moved past intersection 62 of the conduit 52 so that the hydraulic fluid from the regulator 16 can flow into the speed or range clutch 56 through the sequence valve 36.

When it is desired to reverse the vehicle again, repositioning the selector valve 18 connects the regulator 16 with the reverse clutch 28 and the forward clutch 24 with the reservoir 12 dumping the conduit 42 to the reservoir 12 with the movement of the spool valve member 68 in the sequence valve 36 to the position illustrated in FIGS. 1 and 2. Accordingly, the operation, that is, of the system engagement of the reverse clutch 28 and re-engagement of the speed clutch 56 will be as previously described but shifting from forward to reverse.

The system 10 provides a means for controlling the sequence of actuation of the speed and direction clutches in a hydraulic transmission so that the forces generated upon a reversal of the vehicle direction are absorbed by the range or speed clutch which is specifically designed to absorb such loads without damage. Further, the system provides for the total disengagement of the clutches to avoid damage that could result from partial disengagement.

It will be understood that the single embodiment described in detail hereinbefore is presented by way of example only and that many changes and modifications can be made thereto without departing from the spirit and scope of the invention.

What is claimed is:

1. Improved hydraulic control means for a vehicle transmission including a speed clutch and direction clutches, a hydraulic fluid reservoir, a hydraulic pump connected to the reservoir, a pressure regulator connected to the pump, and manually operable selector valve means connected to the regulator and with the direction clutches for directing hydraulic fluid to said speed clutch and direction clutches in accordance with the direction and speed desired for the vehicle, the improvement comprising:
sequence valve means connected to said selector valve means and connected with said clutches, said sequence valve means including a shuttle valve receiving hydraulic fluid from the selector valve means and a spool valve connected with said shuttle valve, with said reservoir, and with said speed clutch, said shuttle valve connected between said spool valve and direction clutches, said spool valve dumping pressure fluid from said speed clutch into the reservoir for inactivating said speed clutch when in a bleed position and supplying pressure fluid to said speed clutch for actuating said speed clutch when moved to a pressure position; and,
said spool valve being moved into said pressure position by pressure fluid in said shuttle valve after one direction clutch is activated and biased into said bleed position by a resilient member located therein.

2. An improved sequence valve for use in a controlling a vehicle transmission including a speed clutch and forward and reverse direction clutches, a direction selector valve therefor, and a hydraulic fluid reservoir and a pump for supplying hydraulic fluid to said transmission, said sequence valve comprising:
a valve body member;
a shuttle valve member moveably located in a shuttle valve bore in said body having first and second ends and spaced seal portions in sliding and sealing engagement with said valve body member;

a spool valve member moveably located in a spool valve bore in said body member having first and second ends, said spool valve member including spaced seal portions in sliding and sealing engagement with said valve body member;

resilient means located in said spool valve bore adjacent to the second end thereof biasing said spool valve member toward the first end thereof;

first and second conduit means intersecting said shuttle valve bore opened and closed by said shuttle member for alternately connecting said shuttle valve bore with the reverse and forward clutches and for connecting the shuttle valve bore with the direction selector valve;

third conduit means for connecting the first end of said spool valve bore with spaced locations in said shuttle valve bore;

fourth conduit means intersecting said spool valve bore between the spaced seal portions on said spool valve member for connecting said spool valve bore and speed clutch; and, fifth and sixth conduit means/for connecting said spool valve bore with the pump and with the reservoir, said fifth and sixth conduit means intersecting said spool valve bore whereby upon movement of said spool valve member they are alternately located between and sealed by the seal portions on said spool valve member to connect said speed clutch to said pump and, alternately, to said reservoir.

3. A method for controlling a vehicle transmission that includes a reservoir for hydraulic fluid, a source of pressurized hydraulic fluid, a direction selector valve for directing fluid to a forward or a reverse direction clutch and to said reservoir, a shuttle valve connected to said direction selector valve and to said forward and reverse direction clutches, and a sequence valve connected to said speed clutch, to said shuttle valve and to said reservoir, the method comprising the steps of:

shifting said direction selector valve to disengage one of said direction clutches and to engage the other direction clutch from said disengaged clutch to said, reservoir to lower the pressure in said sequence valve;

shifting said sequence valve in response to said lowered pressure and dumping the hydraulic fluid in said speed clutch to said reservoir disengaging said speed clutch;

increasing the pressure in said engaged clutch to actuate said disengaged clutch;

shifting said sequence valve to stop fluid flow to said reservoir from said speed clutch;

increasing pressure in said speed clutch to actuate said speed clutch after said engaged direction clutch is fully engaged.

4. Sequence valve means for a hydraulic vehicle transmission that includes direction clutches and a speed clutch and a hydraulic fluid reservoir, the control means comprising:

a shuttle valve having a shuttle valve member moveably located therein;

a sequence valve having a spool valve member moveably located therein and biasing means urging said spool valve member toward a first end of said sequence valve, said spool valve member being responsive to fluid pressure in said first end to move in opposition to said bias;

first conduit means for connecting said shuttle valve with a direction selector valve and with the direction clutches;

second conduit means for connecting said sequence valve with a source of pressurized hydraulic fluid, the speed clutch, and the reservoir, said speed clutch and reservoir being connected through said sequence valve and second conduit means when said spool valve is adjacent to said first end; and, third conduit means connecting said sequence valve and shuttle valve for delivering hydraulic fluid to the first end of said sequence valve to move said spool valve member in response to fluid pressure in one of said direction clutches to connect the speed clutch to the source of pressurized fluid actuating the speed clutch after the direction clutch is fully engaged.

5. The vavle means of claim 4 and including a housing having a first bore receiving said shuttle valve member and a second bore receiving said spool valve member.

6. The valve means of claim 5 wherein:

said spool valve member has spaced sealing surfaces thereon sealingly engaging said housing in said second bore; and, said shuttle valve has spaced sealing surfaces thereon sealingly engaging said housing in said first bore.

7. The valve means of claim 6 wherein:

said second conduit means includes first, second, and third conduits intersecting said second bore;

said first conduit connects said second bore with the speed clutch in all positions of said spool valve member;

said second conduit connects said second bore with the source of pressurized fluid and with said first conduit when said spool valve member is moved away from said first end; and, said third conduit connects said second bore with the reservoir and with the first conduit when said spool valve member is located at said first end.

8. The valve means of claim 7 wherein:

said third conduit means includes a conduit connected to the second bore at said first end and connected at two intersections to said first bore; and, said spaced seal portions on said shuttle valve member are located to alternately close one of said two intersections.

* * * * *